July 27, 1965 M. E. ARTHUR ETAL 3,197,761

ANALOG-TO-DIGITAL CONVERTER UTILIZING ELECTROSTATIC MEANS

Filed Dec. 26, 1961

INVENTORS
MERWYN E. ARTHUR
FRANK F. MYERS

BY Paul D. Carmichael
ATTORNEY

United States Patent Office 3,197,761
Patented July 27, 1965

3,197,761
ANALOG-TO-DIGITAL CONVERTER UTILIZING ELECTROSTATIC MEANS

Merwyn E. Arthur and Frank F. Myers, Endicott, N.Y., assignors to International Business Machines Corporation, New York, N.Y., a corporation of New York Filed Dec. 26, 1961, Ser. No. 162,041
2 Claims. (Cl. 340—347)

The present invention relates generally to the data converting arts and more particularly to an improved conversion system for receiving an information containing signal, sampling the same and providing coded output signals corresponding to the sampled quantities. The information containing input signal may be in analog form while the outputs from the conversion system may be a plurality of binary coded digital signals, for example.

Analog-to-digital conversion systems are well known in the art and find wide application when used in input and output operations for digital data processors. Such conversion systems can be classified in accordance with the type of the analog input and their intrinsic operation. For example, where the analog input is manifested by the angular position or movement of a shaft, a shaft digitizer is employed. A disc or drum having plural rings of conductive segments corresponding in number to the number of orders of significance of the digital output signals are provided. Each conductive segment is energized from a common hub mounted on the input shaft and at least one brush is associated with each ring of conductive segments. When the input shaft is positioned in accordance with the analog input, the presence or absence of voltages on the brushes represents the electrical digital equivalent of the analog input.

Another type of conversion system employs a cathode ray tube having a coded mask positioned over the face thereof. Photocells or other radiation responsive devices are positioned on the opposite side of the mask and the analog electrical signal is applied to one of the deflection means for the cathode ray tube. An analog signal applied to the deflection means causes the electron beam to be deflected by an amount proportional to the analog input signal and the radiation responsive devices provide a unique pulse series representing the corresponding digital signal. This type of conversion system finds wide usage in pulse code modulation communication systems for converting the magnitude of sampled audio signals to digital pulse trains for transmission.

The above mentioned analog-to-digital conversion systems are only representative of a wide variety of systems heretofore proposed in the art. A more complete description of the above and other data conversion systems is contained in the book entitled "Analog-Digital Conversion Techniques," edited by Alfred A. Susskind and published jointly in 1957 by The Technology Press of the Massachusetts Institute of Technology and John Wiley & Sons, Inc., New York, New York.

Although such prior art data conversion systems are widely employed, the need exists for such a system which is capable of sampling an analog waveform and providing coded output signals corresponding to the sampled quantities wherein the analog signal occurs in a very small time increment. A mechanical converter or encoder is a relatively slow acting device, being limited by the inertia of the parts and the responses thereof. Electronic conversion systems are much faster but are limited by the transient responses and capabilities of their individual components. For example, it may be desired to sample, digitize and analyze the transient of an electronic circuit which occurs within the order of ten microseconds. Further, it is often desirable to analyze an aperiodic signal whose time of occurrence is not known. Conventional data conversion systems are incapable of handling such an analog input signal since the various decoding means cannot respond thereto with the required degree of accuracy.

Accordingly, the invention relates to a highly improved analog-to-digital conversion system which samples an analog input signal occurring in a very short time interval and converts the sampled quantities into corresponding coded output signals. The analog input signal is applied to a storage device where the same is temporarily stored. During the time that the analog signal is stored, the same is sampled and the sampled quantities are converted to provide coded output signals corresponding to and defining the analog input signal. Means are also provided for changing the time base and/or gain of the stored analog input signal whereby data can be compressed or expanded with respect to time.

In the disclosed form of the invention the storage device takes the form of an electrostatic storage tube. The analog input signal is applied to one of the deflection means while sweep circuits energize the other deflection means whereby the analog input signal is stored on the face of the storage tube. The deflection means are thereafter energized under the control of a pair of binary counters operating through digital-to-analog conversion devices. The electron beam is caused to move across the face of the electrostatic storage tube in an orthogonal pattern and each time the electron beam engages the previously stored analog signal this coincidence is detected and the contents of the counters are read out to bulk storage. The outputs from the counters are coded digital signals representing the orthogonal coordinates of a particular point of the analog input signal. One of the counters is then reset while the remaining counter is advanced by one increment. This series of operations continues until the face of the electrostatic storage tube has been completely scanned and the digital signals representing the coordinates of the points along the analog signal have been transferred to bulk storage. These digital signals may then be supplied to a digital data processor for analysis. The electrostatic storage tube is provided with means for extending or decreasing the area on the face of the electrostatic storage tube on which the analog input signal is stored. A convenient means is provided for changing the time base and/or gain of the analog input signal whereby the same may be compressed or expanded.

It is the primary or ultimate object of this invention to provide an improved data converting system wherein an input signal occurring in a very short time interval is temporarily stored, sampled and the sampled quantities provide digitally coded output signals.

Another object of the invention is to provide a data conversion system wherein an analog signal is temporarily stored in a cathode ray tube or the like and the deflection means therefor are actuated to scan the face of the tube under the control of counters which are incremented in accordance with the code of the desired output signals. The deflection means are used not only when storing the analog signal but also during sampling and conversion operations.

A further object of the invention is to provide a data conversion system wherein the data to be converted can be compressed or expanded. Such an arrangement may be highly advantageous in the reception or transmission of information where it is desired to minimize the length of transmission.

A still further object of the invention is to provide a data conversion system having the characteristics set forth above which is highly simplified and reliable in operation.

The foregoing and other objects, features and advantages of the invention will be apparent from the following more particular description of preferred embodiments of the invention as illustrated in the accompanying drawings.

Figures 1, 2, 3:
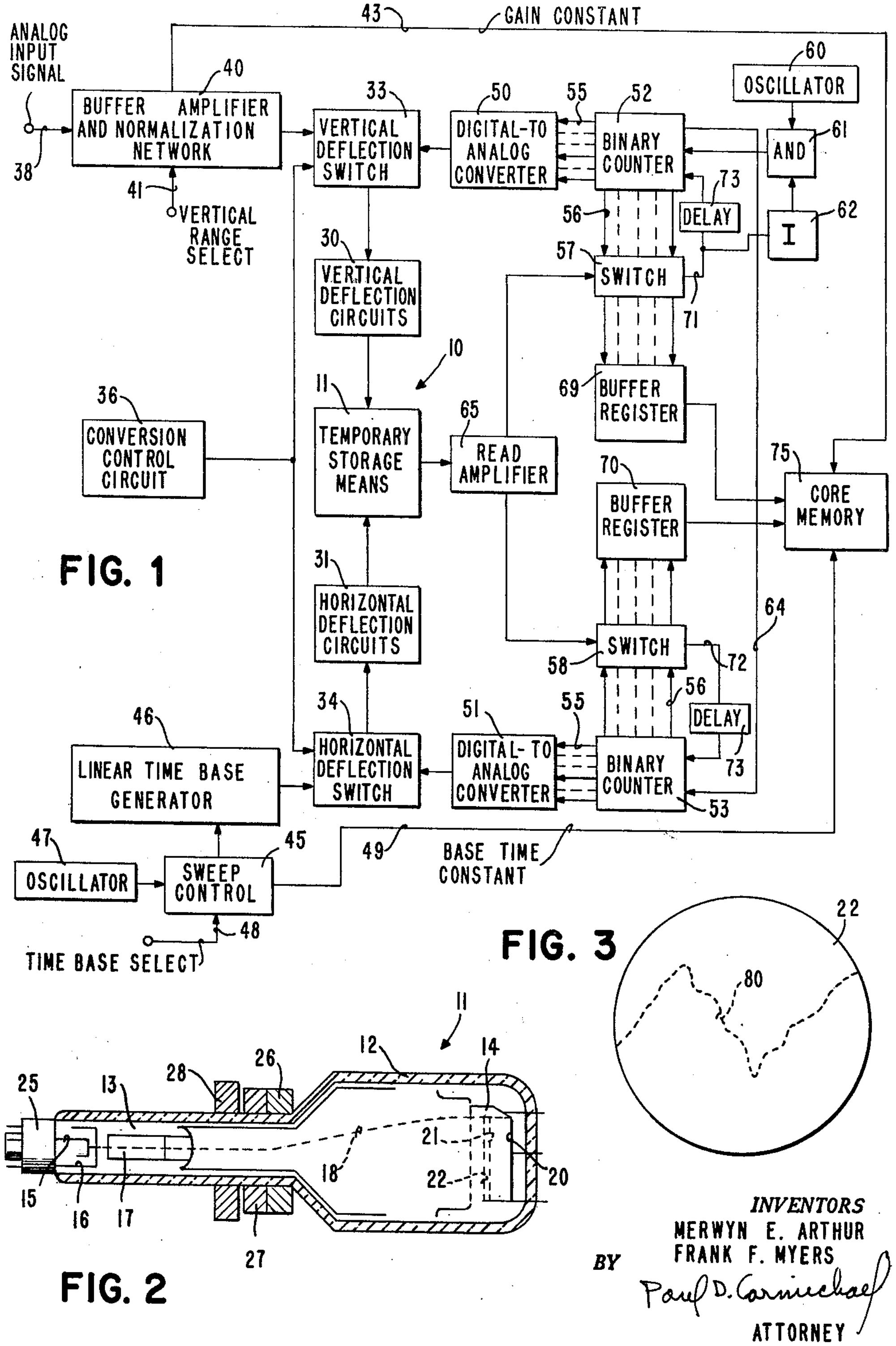
FIGURE 1 is a schematic block diagram of an analog-to-digital conversion system constructed in accordance with and employing the teachings of the present invention.
FIGURE 2 is a schematic side sectional view of the temporary storage means used in the system of FIGURE 1.
FIGURE 3 is a schematic end view of the storage screen with a charge pattern corresponding to an analog input signal recorded thereon.

Referring now to the drawings, and initially to FIGURE 1 thereof, the analog-to-digital conversion system comprises as the main element thereof a temporary storage device generally indicated by the reference numeral 10. In the disclosed embodiments of the invention, the temporary storage device is an electrostatic storage tube 11. As will be hereinafter more fully apparent, the electrostatic storage tube offers many inherent advantages when employed in the conversion system. However, it should be understood at the outset, that other types of temporary storage devices having the necessary characteristics may be employed.

As shown in FIGURE 2, the electrostatic storage tube 11 comprises an evacuated envelope 12. Mounted within and at the opposite ends of the envelope are an electron beam source 13 and a collector-signal assembly 14. The electron beam source 13 includes a cathode 15, grid 16 and anode 17 for directing an electron beam 18 toward the collector-signal assembly 14. The assembly 14 has a signal electrode 20 and a storage screen 21, the latter being positioned between the electron beam source and the signal electrode. The side of the storage screen 21 facing the electron beam source 13 is coated with a dielectric material, such as calcium fluoride, to define a storage surface 22. Electrical connections are made with the various elements of the storage tube through the pin type connector 25 at the rear of the envelope 12. Vertical and horizontal deflection coils 26 and 27 are disposed about the envelope between the electron beam source 13 and the collector-storage assembly 14. As is conventional, focusing coils 28 are also provided.

The electrostatic storage tube performs a temporary storage function in that a charge pattern corresponding to the input signal applied to the deflection coils is "written" and retained on the storage surface 22. An operational cycle of the tube can be considered as comprising four phases—erase, prime, write and read. In the first three phases the electron beam is employed to vary the charge level on the storage surface 22 while during the read phase, the charge pattern previously written on the storage surface regulates that portion of the electron beam which is allowed to pass to the signal electrode 20.

In erasing any previous pattern stored on the storage surface, the voltage on the storage screen is set above the critical potential of the dielectric material forming this surface. The electron beam 18 scans the storage surface to charge the same positively to the potential of the storage screen 21. The electrostatic storage tube is then primed by adjusting the potential on the storage screen to a value somewhat below the critical value of the dielectric material defining the storage surface. The electron beam again scans the storage surface and the same is at the potential of the cathode 15. A potential difference now exists between the storage surface 22 and the storage screen 21.

In the write phase of an operational cycle, the potential of the storage surface is adjusted so that the same is above the critical value. The electron beam is moved across the storage surface in accordance with the input signals supplied to the deflection coils so that areas of the dielectric material are charged toward the storage screen potential. In this manner a charge pattern corresponding to the input signal is written and stored on the storage surface 22 of the electrostatic storage tube.

To read the stored charge pattern which corresponds to the input signal, the potential of the storage screen 21 is adjusted to a value so that those areas of the coating surface which are not at the potential of the storage screen (do not form a portion of the charge pattern) are sufficiently below the potential of the cathode so as to be effectively cut off from the signal electrode 20. The electron beam scans the storage surface and those areas thereof defining a portion of the charge pattern corresponding to the input signal allow a portion of the electron beam to pass to the signal electrode 20. Output signals are taken from the signal electrode 20 which are delayed in time with respect to and correspond to the input signal.

The length of time that information can be stored in an electrostatic storage tube is primarily dependent upon the leakage or dissipation of the charge pattern on the storage surface. The storage time of such a device is usually in the range of minutes or fractions thereof. Such a time interval is quite large when compared with a transient electrical signal occurring in several hundred-thousandths of a second, for example. The response or writing speed of such a storage device is quite high and, as will be hereinafter more fully apparent, this is the effective limitation on the speed of operation of the analog-to-digital conversion system.

A typical electrostatic storage tube which may be employed in carrying out the teachings of the invention is Raytheon type QK 464. More information concerning this particular tube is contained in an article by R. C. Hergenrother, A. S. Luftman and C. E. Sawyer entitled "Improved Storage Tube Design" and appearing in the March 1956 issue of "Tele-Tech & Electronic Industries." Electrostatic storage tubes have been proposed for use as the main storage units or memory in large scale digital data processors. The digital data is stored in the tubes and then read out as required during processing operations. See, for example, U.S. Patent No. 2,950,465 to Fox et al. which is assigned to the assignee of the present invention.

The vertical deflection coil 26 is energized by the output of vertical deflection circuits 30 while horizontal deflection circuits 31 are connected with horizontal deflection coil 27. The vertical and horizontal deflection circuits are in turn controlled by vertical deflection switches 33 and 34, respectively. In general, the horizontal and vertical deflection switches are capable of accepting analog input signals either from analog input apparatus during storing or writing operations or converting apparatus during sampling and converting operations. The deflection switches 33 and 34 are actuated under the control of conversion control circuit 36 whereby the deflection coils 26 and 27 are initially connected to the analog input apparatus until the charge pattern corresponding to the input signal has been recorded on the storage surface 22 of the electrostatic storage tube and thereafter are connected to conversion apparatus.

The construction of the deflection circuits 30 and 31 is well known in the art and they may be of the type illustrated in the vertical amplifier section of the "Instruction Manual for Cathode-Ray Oscilloscope Type 541," published by Tektronix, Inc., Sunset Highway and Barnes Road, Portland 7, Oregon, although modified to drive electromagnetic deflection coils. A preferred form of the vertical and horizontal deflection switches and the conversion control circuit is disclosed in the circuit diagram figure of the "Instruction Manual for Plug-In Unit Type 53/54C" which is also available from Tektronix, Inc. The switching multivibrator and the trigger coupling diode would be replaced with a flip flop or other bistable device to define the conversion control circuit 36. The conversion control circuit produces signals controlling the deflection switches 33 and 34 and can be actuated automatically in response to the electron beam reaching the opposite side of the storage surface 22 at the end of a writing operation.

One input to the vertical deflection switch 33 is the analog input signal which is applied over conductor 38 from a source thereof, not shown. The input signal passes through a buffer amplifier and normalization network 40 where the same is amplified in accordance with and under the control of a vertical range select signal supplied over conductor 41. The arrangement is such that the gain or amplitude of the analog input signal can be adjusted as desired. Normally, the vertical range select signal is set so that the full vertical extent of the storage surface 22 will be utilized for a given input signal. Network 40 also provides a gain constant signal on conductor 43 representing the gain or amplitude distortion of the analog input signal. The use of this signal will be hereinafter more fully described.

The corresponding input from the analog input apparatus to horizontal deflection switch 34 is provided by sweep control circuits 45 via a linear time base generator 46. The sweep control circuits 45 are triggered periodically by an oscillator 47 and produce a periodic linear ramp function or sawtooth waveform which causes the electron beam to be deflected horizontally across the storage surface 22 at a predetermined rate. The oscillator 47 can in turn be made responsive to the analog input signal supplied over conductor 38 and this is particularly advantageous when converting an aperiodic signal whose time of occurrence is not known. The sweep control circuits 45 are responsive to a time base select signal applied over conductor 48 which, in essence, controls the slope of the sawtooth waveform generated by these circuits. The slope of the waveform determines the speed at which or the time interval required for the electron beam to move horizontally across the storage surface. The time base of the analog input signal can be expanded or contracted as desired under the control of the time base select signal. This, in combination with the vertical range select signal, allows the compression or expansion of data for minimizing the length of transmission, for example. A base time constant signal appears on conductor 49 and corresponds to the time base on which the analog input signal is stored in the electrostatic storage tube.

Preferred embodiments of the buffer amplifier and normalization network 40 and the linear time base generator 46 are shown in the circuit diagram figure of the above-identified Textronix "Instruction Manual for Plug-In Type 53/54C." The oscillator 47 and the sweep control circuits 45 are of the type described in section 4.6, pages 132–139, volume 22, entitled "Cathode Ray Tube Displays" of the Massachusetts Institute of Technology Radiation Laboratory Series.

The conversion apparatus which is connected to the vertical and horizontal deflection circuits during sampling and conversion operations comprises a pair of digital-to-analog converters 50 and 51. These converters are in turn controlled by a pair of binary counters 52 and 53 whereby voltage level output signals energize the deflection circuits during sampling and converting operations to position the electron beam on the storage surface in accordance with the counts stored in the counters. Converter 50 and counter 52 are associated with the vertical deflection circuits 30 while the horizontal deflection circuits 31 are controlled by digital-to-analog converter 51 and binary counter 53.

The number of stages in each of the counters is dependent upon the resolution required in the coded output signals. For example, assuming straight binary coding is employed and that each counter has seven stages, then the storage surface of the electrostatic storage tube is represented by 16,384 points corresponding to the crossover points of an imaginary matrix of 128 lines by 128 lines. Each of the crossover points is defined by a unique pair of binary numbers representative of the orthogonal coordinates thereof. For each change in count of one increment in the binary counter 52, the electron beam will be moved to the next horizontal line in the matrix while a similar change in the count of counter 53 will cause the electron beam to move to an adjacent vertical line of the matrix.

The capacity or number of stages for each of the counters is determined by the requirements imposed on the conversion system and the inherent limitations of the electrostatic storage tube. The spacing between the various crossover points of the matrix should not be so small that the same exceeds the resolution of the electrostatic storage tube or provides more information than required in a given application. Conversely, the points of the matrix must be close enough together so the necessary information is provided—i.e. relevant portions of the input signal are not recorded between the points of the imaginary matrix. If the electrostatic storage tube has a one inch square storage surface and seven stage binary counters are employed, a resolution in excess of 100 lines per square inch is provided. It should be understood that this illustrative example is not intended to restrict the present invention.

The converters 50 and 51 are matched to the binary counters 52 and 53 in that the electron beam will have covered all portions of the storage surface of the electrostatic storage tube when both counters are full. The counters are of the type disclosed in section 18–D3, volume 2, "Handbook of Automation, Computation and Control," published in 1959 by John Wiley & Sons, Inc., New York, New York. Each stage of the counters provides an output signal representing the state thereof which is applied over one of the conductors 55 to the associated digital-to-analog converter and over one of the conductors 56 to one of the switches 57 and 58. The digital-to-analog converters may be of the type commercially available from the Packard-Bell Computer Corporation, Los Angeles 25, California, under their basic model number 242.

The binary counter 52 is incremented by an oscillator 60 whose pulses are applied through an And block 61. The other input to the And block 61 is the output signal of an inverter 62. As will be understood by those skilled in the digital data processing arts, an And block performs Boolean multiplication in that all input signals must be present before an output signal is provided. An inverter performs inversion whereby a signal representing the binary one level applied to the input will cause a signal corresponding to the binary zero level to appear at the output. Examples of typical circuits of this type and more detailed descriptions of their operation are contained in sections 14–34 and 16–23 of the above-identified volume of the "Handbook of Automation, Computation and Control." Whenever the And block 61 is enabled, the binary counter 52 is advanced at the rate of operation of the oscillator 60.

The binary counter 53 is advanced in response to pulses occurring on conductor 64 leading from the binary counter 52. The signal on conductor 64 occurs each time the counter 52 is filled to capacity and advances the count stored in the binary counter 53 by one increment. Assuming there is no charge pattern corresponding to an analog input signal recorded on the storage surface of the electrostatic storage tube and the conversion apparatus is operatively connected with deflection circuits 30 and 31, the electron beam will be advanced incrementally along a vertical line in response to the pulses recorded by the counter 52. When the entire extent of this vertical line has been scanned, the counter 52 will be full and the next pulse will cause the same to reset to zero. At this time a pulse is produced on conductor 64 which advances the counter 53 by one. As a result, the electron beam is moved to an adjacent vertical line. Of course, the electrostatic storage tube is provided with conventional retrace and blanking circuitry, not particularly shown. The counters 52 and 53 are eventually both filled to capacity and at this time the entire area of the storage surface of the electrostatic storage tube has been scanned.

Connected with the signal electrode 20 of the electrostatic storage tube is a read amplifier 65 which, during sampling and conversion operations, provides a pulse output whenever the electron beam strikes a portion of the previously recorded charge pattern on the storage surface corresponding to the analog input sginal. The read amplifier 65 can be any one of a number of well known amplifiers for producing these results. Typical circuitry for this purpose is shown in FIGURE 6*bo* of U.S. Patent No. 2,950,465 which is assigned to the assignee of the present invention. The pulse outputs of the read amplifier are applied to the switches 57 and 58 associated with the binary counters 52 and 53, respectively.

The switches 57 and 58 are essentially a series of And blocks each receiving inputs from the read amplifier 65 and one stage of the associated binary counter 52 or 53 over one of the conductors 56. Whenever the read amplifier 65 provides output pulses—indicating the electron beam has hit a portion of the charge pattern recorded on the storage surface—the counts within the binary counters 52 and 53 are gated out via switches 57 and 58 to their associated buffer registers 69 and 70. The buffer registers 69 and 70 perform a temporary storage function and each of these devices comprises a series of interconnected bistable storage elements.

Whenever the switches 57 and 58 are interrogated, the output pulses are produced on conductors 71 and 72. The pulse on conductor 72 advances the binary counter 53 by one while the pulse on conductor 71 resets the counter 52 to zero. Suitable delay means 73 are interposed in the conductors 71 and 72 are shown to permit interrogation of the switches 57 and 58 prior to resetting of counter 52 and advancing of counter 53. In addition, the pulse on conductor 71 is supplied to inverter 62 whereby the And block 61 is disenabled and pulses from the oscillator 60 are not counted by the binary counter 52. The electron beam of the electrostatic storage tube is returned to the opposite side of the storage surface during the time interval defined by the length of the pulse on conductor 71.

The buffer registers 69 and 70 are interconnected with a bulk store, such as a core memory 75, which may form the memory of a large scale digital data processor. The buffer registers are interrogated in accordance with the timing of the core memory and the contents thereof are transferred to proper storage locations within the core memory. Although illustrated as being separate components, the buffer registers may be integral parts of the core memory 75, such as the memory register and address register thereof. The buffer registers perform a time translation since the core memory operates in a synchronous manner while the switches are gated in asynchronously; depending upon where the charge pattern corresponding to the analog input signal has been recorded on the storage surface. These registers are also shown as performing a parallel-to-serial data translation. Obviously, the necessity of the latter translation will depend upon the characteristics and type of the bulk store employed in a particular application.

The conductors 43 and 49 provide the remaining inputs to the core memory 75. As previously mentioned, the signals on these conductors represent the gain constant and base time constant and are indicators of the horizontal and vertical compression and/or expansion of the analog input signal. The coded outputs of the switches and buffer registers which represent the orthogonal coordinates of points along the charge pattern previously stored on the storage surface in combination with the gain and base time constant signals provide all of the data required for a complete analysis of the analog input signal.

Considering now the operation of the above described conversion system, it will be assumed the electrostatic storage tube has been erased and primed. The conversion control circuit is set 36 so the vertical and horizontal deflection circuits 30 and 31 are connected with the analog input apparatus. The base time select and vertical range select signals are adjusted to insure full utilization of the storage surface in accordance with the expected range of the input signal. The conversion system is now ready to receive the analog input signal whenever it occurs.

The analog input signal is applied over conductor 38 to the vertical deflection circuits 30 whereby a charge pattern corresponding to this signal is immediately written on the storage surface 22 of the electrostatic storage tube. The resulting charge pattern is schematically illustrated by the broken line 80 in FIGURE 3 of the drawings. The expansion and/or contraction of the analog input signal in the horizontal and vertical directions will depend upon the time base select and the vertical range select signals. The analog input signal is recorded in a minimum of time since the response and writing speed of the electrostatic storage tube are quite high. The response of the tube is not limited to the inertia of mechanical parts as is the case with shaft digitizer or the like. Also, it will be noted that the analog input signal is not sampled or converted immediately.

A preferred representation of the analog input signal is stored at a very fast rate for sampling and conversion at a slower rate and a later time.

As soon as the electron beam reaches the opposite side of the storage surface and the charge pattern corresponding to the analog input signal has been recorded, the conversion control circuit 36 is operative to interconnect the vertical and horizontal deflection circuits with the conversion apparatus. At the same time, the electron beam is blanked and returned to its starting position and the potential on the storage screen 21 is adjusted as hereinabove described.

The oscillator 60 now advances the binary counter 52 and the electron beam 18 moves along a vertical line across the storage surface 22 in response to the output of digital-to-analog converter 50. If a portion of the previously stored charge pattern crosses this vertical line, the signal electrode 20 will provide an output pulse which is amplified by read amplifier 65 and gates out the contents of the counters to buffer registers 69 and 70. The count in buffer register 69 will correspond to the vertical coordinate and the count in buffer register 70 will correspond to the horizontal coordinate of the point of intersection between the vertical line and the charge pattern on the storage surface. The counters record the count in binary whereby the signals in the buffer registers are binary coded. The buffer registers are thereafter interrogated in accordance with the timing of the core memory 75 and the coded output signals are transferred to the bulk store.

The signal from the read amplifier 65 also causes the counter 52 to be reset to zero and the counter 53 to be advanced after a short delay by one. In the event no portion of the charge pattern crosses this vertical line, the counters 52 and 53 will be reset and advanced, respectively, when the binary counter 52 has been filled to capacity. The counts in the counters are not gated out at any time during this vertical scan and no coded output signals are transferred to the buffer registers.

The above series of steps are repeated until the entire storage surface of the electrostatic storage tube has been scanned and the coded signals representing the orthogonal coordinates of points along the recorded charge pattern have been transferred to the core memory. These coded signals, in combination with the gain constant and base time constant signals, provide all the information required for complete analysis of the analog input waveform. The charge pattern on the storage surface is erased, the electrostatic storage tube is primed and the conversion control circuit connects the deflection circuits with the analog input apparatus whereby the analog-to-digital conversion system is ready to receive, store, sample and convert the next analog input signal.

It should now be apparent that the objects initially set forth have been accomplished. Of particular importance is the provision of a highly improved analog-to-digital conversion system wherein an analog input signal occurring in a very short time interval or of the aperiodic type is sampled and the sampled quantities are converted to coded output signals over a much longer time interval. Means are provided within this conversion system for the expansion and/or compression of information. The conversion system may be interconnected with transmission or receiving equipment, for example. The system is not limited to analog-to-digital conversions but can be used in converting digital input signals to an analog output signal. Further, the counters may be coded in accordance with the particular type of coded output signals desired, such as pure binary, binary coded decimal, etc.

Obvious changes can be made in the conversion system without departing from the teaching of the invention. For example, it is possible to initially reverse the connections between the converters and the deflection switches for determining the high and low points or vertical range of the charge pattern recorded on the storage surface. The high and low counts (representing the vertical extent of the charge pattern) recorded by the counter connected with the vertical deflection circuits would then be used to set the voltage limits on the digital-to-analog converter associated with the vertical deflection circuits when the original connections are restored. Thereafter, the scanning of the storage surface would take place in a limited vertical area.

While the invention has been particularly shown and described with reference to a preferred embodiment thereof, it will be understood by those skilled in the art that the foregoing and other changes in form and details may be made therein without departing from the scope of the invention.

What is claimed is:

1. An analog-to-digital conversion system for receiving an analog input signal, storing a representation of the same and thereafter sampling the stored representation of said analog input signal and converting the sampled quantities to coded digital output signals comprising:

an electrostatic storage tube having an electron beam source, a storage surface and a signal electrode;

a pair of coordinate deflection means for controlling the deflection of the electron beam;

a source of a sweep signal;

means to apply said sweep signal and said analog input signal to said coordinate deflection means to cause a representation of said analog signal to be recorded on said storage during a first time interval;

first and second counters connected in cascaded relation whereby advancement of the first counter through its maximum count to a reset condition causes the second counter to be advanced by one increment;

means interconnecting said first and second counters with said deflection means during a second time interval for deflecting said beam in the vertical direction in response to the count of the first counter and for deflecting said beam in the horizontal direction in response to the second counter;

a source of pulses for incrementing the first counter;

said signal electrode providing a control signal whenever said electron beam engages said representation of said analog input signal recorded on said storage surface during said second time interval;

means responsive to said control signal to interrogate the counts in said counters to read out the digital equivalents of that portion of the input signal representation engaged by the beam;

means responsive to said control signal and operative after read-out of said counters to cause the first counter to be reset and the second counter to be advanced by one increment to initiate a new signal by said electron beam without continuing the previous signal beyond the point at which the analog input signal representation was engaged; and storage means for storing the digital equivalent of the input signal representation read out of said counters.

2. The invention defined in claim 1 including:

means to control said source of said sweep signal to regulate the time-base of said representation of said analog input signal recorded on said storage surface, means to control said means to apply the analog input signal to regulate the gain of said representation of said analog input signal recorded on said storage surface, and means for storing indications of the time-base of said representation and the gain of said representation with the digital equivalents of the input signal in said storage means.

References Cited by the Examiner

UNITED STATES PATENTS

| | | | |
|---|---|---|---|
| 2,908,836 | 10/59 | Henderson | 313—68 |
| 2,957,104 | 10/60 | Roppel | 315—8.5 |
| 2,967,969 | 1/61 | Stocker | 315—8.5 |

OTHER REFERENCES

IBM Technical Disclosure Bulletin, vol. 2, No. 4, December 1959 (pp. 56 and 57 relied on).

MALCOLM A. MORRISON, *Primary Examiner.*